(No Model.)
C. D. PHELPS.
Dumping Machine.
No. 232,202.   Patented Sept. 14, 1880.
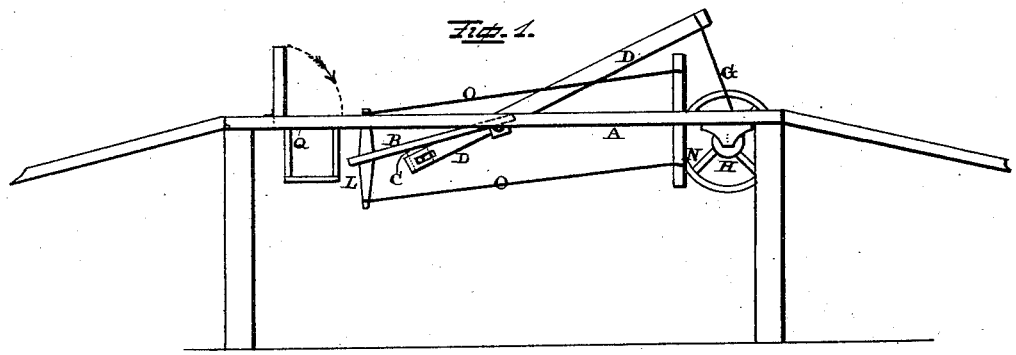
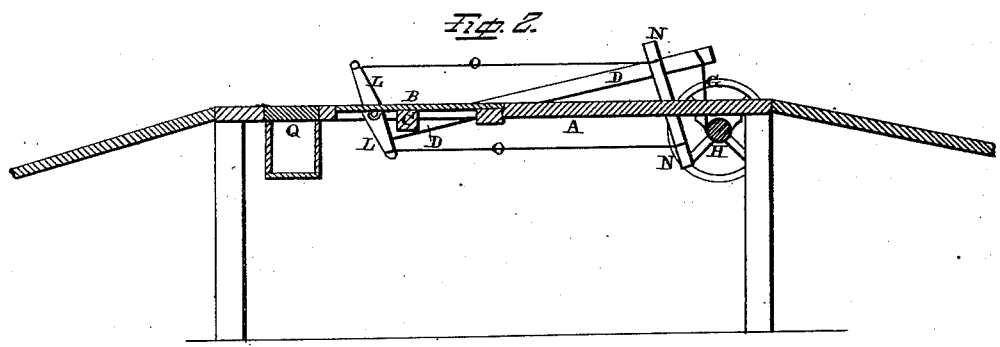
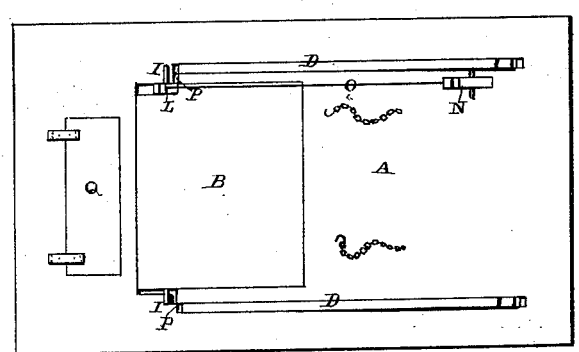
Witnesses
W. W. Mortimer
Will H. Kern
Inventor
C. D. Phelps,
per
F. A. Lehmann,
Atty

UNITED STATES PATENT OFFICE.

CLINTON D. PHELPS, OF IRVING, KANSAS.

DUMPING-MACHINE.

SPECIFICATION forming part of Letters Patent No. 232,202, dated September 14, 1880.

Application filed July 29, 1880. (No model.)

*To all whom it may concern:*

Be it known that I, CLINTON D. PHELPS, of Irving, in the county of Marshall and State of Kansas, have invented certain new and useful Improvements in Dumping-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in portable dumping-machines; and it consists in a platform which is raised a suitable distance above the bin, car, or other object into which the wagon or cart is to be unloaded, and which is provided with a trap-door which is hinged at one end, and which is provided with a mechanism whereby it may be lowered downward, so as to lower the rear end of the wagon which is standing upon it until all the grain, potatoes, or other objects in the wagon will slide out at its back end, as will be more fully described hereinafter.

The object of my invention is to provide a means for unloading wagons whereby the whole load can be dumped at once, as from a tilting cart, and thus save the time and labor of taking the load out by means of shovels.

Figure 1 is a side elevation of my invention. Fig. 2 is a vertical section of the same. Fig. 3 is a plan view of the same.

A represents a suitable platform, which is raised upward above the ground by means of supports of any kind, and which has an incline secured to each end, so that wagons which are to be unloaded can be driven upon the platform at one end and off at the other. Through this platform is made a large opening, which is closed by the trap-door B, which is hinged or pivoted at its front end, and which can be dropped downward at its rear end to any desired distance. This rear end has a beam or rod extending across its under side, and the ends of this rod or beam C pass through the slots in the rear ends of the levers D. These levers are pivoted in slots which are made through the platform, and are connected at their front ends, by means of the ropes or chains G, with the drum H, which drum has a hand-wheel secured to one end. When the wagon is standing upon this platform, and the hand-wheel is turned so that the ropes or chains are unwound from the drum, the rear end of the trap-door sinks downward, carrying the rear end of the wagon with it; but when the hand-wheel is turned in the opposite direction the drum winds the ropes or chains upon it, so as to raise the trap-door into position again. In order to lock this trap-door in position, so that it cannot sink downward at its rear end until it is desired that it should do so, a rod, I, having its ends bent so as to catch over the top of the platform, is secured to its rear end. Fastened to this rod having the bent ends is an operating-lever, L, which lever is connected at each end, by means of a cord or chain, O, to a second pivoted lever, N. By moving the upper end of the lever N toward the trap-door the lever L turns the rod I so that its bent ends will catch over the top of the platform; but when the front end of the lever N is turned toward the front end of the platform this rod I is turned forward, so that its ends no longer catch over the top of the platform, but drop down through the openings P, made for this purpose, and then the rear end of the trap-door, being no longer supported in position, sinks down, as already described, so as to lower the rear ends of the loaded wagon.

The wagon is driven upon the platform so that its rear wheels rest upon the trap-door, and then the lever N is moved so as to unfasten the rear end of the trap-door, when the hand-wheel is turned so as to unwind the cord or chain from the drum, and the rear end of the trap-door sinks downward, carrying the wagon with it, until the body of the wagon is inclined at such an angle that the whole load will slide out at its rear end, as from a cart that has been tilted up.

Through the platform, just in the rear of the trap-door, is made a hole or opening, Q, which connects with a spout which conducts the load into a car, bin, or other desired receptacle made to receive it.

By thus tilting up the end of the wagon all the time, trouble, and labor of unloading wagons by means of shovels is done away with.

Having thus described my invention, I claim—

1. The combination of the platform A, trap-door, and levers attached to the trap-door at their rear ends and attached by means of ropes or chains to a suitable drum at their front ends, with a supporting device for holding the rear end of the trap-door in position, substantially as shown and described.

2. The combination of the trap-door, the rod I, having its ends bent, levers L N, and connecting cords or chains O, substantially as described.

In testimony that I claim the foregoing I have hereunto set my hand this 16th day of July, 1880.

CLINTON D. PHELPS.

Witnesses:
 J. S. WALKER, Jr.,
 E. W. STEPHENS.